United States Patent Office 2,765,313
Patented Oct. 2, 1956

2,765,313

PREPARATION OF THIOFORMAMIDES

James S. Strong, Philadelphia, Pa., assignor to Rohm & Haas Company, Philadelphia, Pa., a corporation of Delaware No Drawing. Application January 23, 1953, Serial No. 332,993

7 Claims. (Cl. 260—293.4)

This invention concerns a method for preparing N-substituted thioformamides. This method comprises bringing together in a volatile, inert organic solvent and there reacting a primary or secondary amine, hydrogen sulfide, and hydrogen cyanide.

Thioformamides having N-substituents have been prepared by reacting formamide with phosphorus pentasulfide to form thioformamide and then reacting the thus obtained thioformamide with a primary or secondary amine. Also potassium dithioformate has been prepared and reacted with an amine to form N-substituted thioformamides.

The present method for preparing N-substituted thioformamides is definitely more direct and yet more flexible than previously proposed procedures. Furthermore, it permits starting with primary materials and passing in one procedural step to the desired products. This method comprises bringing together in an inert, volatile organic solvent, such as methanol, ethanol, isopropanol, butanol, acetone, ethyl ether, isopropyl ether, or the like, a primary or secondary amine having only N-hydrogen available for reaction, hydrogen sulfide, and hydrogen cyanide and there reacting these substances together. It it desirable to bring these substances together at low temperatures and to start the reaction under these conditions. The reaction may be continued and completed at relatively higher temperatures. Thus, a temperature range of $-15°$ to $80°$ C. can be used under normal pressure or up to $125°$ C. with pressure. The reaction mixture is stripped of solvent to yield a residue which is chiefly the desired N-substituted thioformamide. Usually this can be purified by distillation under reduced pressure. When the product is solid, it can be isolated by pouring into water a reaction mixture containing a water-miscible solvent. The product is precipitated and is readily recoverable by filtration.

As suitable amines, there may be used primary or secondary amines which have inert substituents. While monoamines are of considerable value as starting materials, diamines having hydrogen on nitrogen thereof are also useful. Typical amines which may be used include methylamine, dimethylamine, ethylamine, diethylamine, ethanolamine, diethanolamine, methylethanolamine, propylamine, propanolamine, dipropylamine, dipropanolamine, butylamine, isobutylamine, dibutylamine, amylamines, hexylamine, 2-ethylbutylamine, octylamine, 2-ethylhexylamine, octylmethylamine, nonylamine, dinonylamine, dodecylamine, dodecylmethylamine, cetylamine, octadecylamine, allylamine, methallyamine, undecenylamine, octadecenylamine, cyclopentylamine, cyclohexylamine, dicyclohexylamine, methylcyclohexylamine, butylcyclohexylamine, dicyclopentenylamine, terpenylamines, benzylamine, butylbenzylamine, benzylmethylamine, dibenzylamine, phenylethylamine, phenylamine, diphenylamine, phenylmethylamine, naphthylamines, butylphenylamine, morpholine, 3,5-dimethylmorpholine, thiamorpholine, pyrrolidine, piperidine, etc.

Most useful monoamines may be summarized by the formula

where $R^1$ is hydrogen, a hydrocarbon group, or a hydroxyalkyl group and $R^2$ is a hydrocarbon group, the hydrocarbon groups containing preferably not over 18 carbon atoms, or a hydroxyalkyl group. In equivalent fashion $R^1$ and $R^2$ may be taken together to form a saturated divalent chain which together with the nitrogen yields a heterocycle, typical chains being —CH$_2$CH$_2$OCH$_2$CH$_2$—, —CH$_2$CH$_2$SCH$_2$CH$_2$—, —CH$_2$CH$_2$CH$_2$CH$_2$—, and —CH$_2$CH$_2$CH$_2$CH$_2$CH$_2$—. The N-substituents are not, however, confined to the above, for groups having inert atoms or groups may likewise appear as $R^1$ and $R^2$. Examples of such equivalent groups appear in dimethylaminoethylamine, dimethylaminopropylamine, ethoxyethylamine, butoxyethylamine, and the like.

Furthermore, the reactive and useful amines are not confined to monoamines, for definite, well-defined products are prepared from polyamines. Typical diamines which may be used include ethylenediamine, N,N'-dimethylethylenediamine, propylenediamine, butylenediamine, hexamethylenediamine, decamethylenediamine, tetradecylenediamine, and the like. The diamines may be summarized by the formula

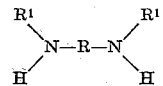

where R is an alkylene chain of two to fourteen carbon atoms and $R^1$ is hydrogen, a hydrocarbon group, or other inert monovalent group.

Typical preparations of N-substituted thioformamides are shown in the following illustrative examples, in which parts are by weight.

*Example 1*

Dimethylamine gas is passed into 240 parts of methanol until 135 parts thereof have been absorbed, the temperature of the solution being kept below 40° C. The solution is then cooled below 25° C. and there are added 81 parts of hydrogen cyanide and then 240 parts of hydrogen sulfide. The mixture is left standing for 72 hours, after which it is heated under reflux to complete the reaction and to drive off excess reactants. Methanol is distilled off by heating on a steam bath, leaving a residue of 267 parts. This is distilled under reduced pressure to yield at 105°–108° C./13 mm. a fraction of 225 parts which corresponds in composition to N,N-dimethylthioformamide.

This compound is an active acaricide. In a standard test against aphids on bean plants it gave a kill of 91% when applied at a dilution of 1:400. A dust containing 10% of this compound gave a kill of 80% against bean beetle larvae, demonstrating insecticidal utility.

*Example 2*

Methylamine is passed into 240 parts of anhydrous methanol at 5° C. until 93 parts have been absorbed. There are then added 81 parts of hydrogen cyanide and 102 parts of hydrogen sulfide. The temperature of the mixture is then allowed to rise to that of the room and the mixture left standing for two hours. It is then heated to 60° C. and heated under reflux for five hours. The reaction mixture is then resolved by distillation. At 141°–144° C./27–30 mm. a fraction of 170 parts is obtained. It is N-methylthioformamide.

Example 3

Ethylamine is passed into 240 parts of methanol at 0°–5° C. until 135 parts have been absorbed. There are then run in 125 parts of hydrogen sulfide and then 81 parts of hydrogen cyanide. During the addition of the last material the temperature of the reaction mixture rises to 20° C., but as the mixture is strongly cooled, the temperature returns to 5° C. The mixture is left standing for 16 hours and heated under reflux at 55°–60° C. for four hours. The mixture is then distilled. The fraction coming over at 125°–140° C./33 mm. consists of 60 parts of N-ethylthioformamide, $HCSNHC_2H_5$.

Example 4

A solution of 219 parts of n-butylamine in 240 parts of anhydrous ethanol is treated with hydrogen sulfide at about 10° C. until 107 parts of hydrogen sulfide have been taken up. Hydrogen cyanide is added to a total of 57 parts. The temperature of the mixture is allowed to rise to about 30° C. The mixture is left standing at this temperature over night and is then cooled below 10° C. There are added 59 parts of hydrogen sulfide and 42 parts of hydrogen cyanide with the temperature kept low. The mixture is now brought to 45° C. and left standing for 72 hours. It is then distilled. At 160°–172° C./25 mm. a fraction of 295 parts is obtained. In consists of N-n-butylthioformamide.

Example 5

To a solution of 129 parts of di-n-butylamine in 80 parts of methanol there is added at 0°–10° C. hydrogen sulfide to a total of 38 parts. Then rapidly with cooling 27 parts of hydrogen cyanide is added. The reaction mixture is allowed to stand at room temperature for 19 hours and is then distilled. After solvent has been taken off, a fraction is taken at 169°–173° C./20 mm. of 137 parts of N,N-di-n-butylthioformamide. It contains 8.2% of nitrogen (theory 8.1%) and 18.3% of sulfur (theory 18.5%).

Example 6

A solution is prepared from 219 parts of tert.-butylamine in 240 parts of anhydrous methanol. With the temperature thereof kept below 20° C. there are added 117 parts of hydrogen sulfide and 81 parts of hydrogen cyanide. A slow exothermic reaction ensues with the temperature rising to 40° C., at which time cooling is applied to hold the temperature below 42° C. The reaction mixture is left standing over night and poured into 1500 parts of water with stirring. A crystalline product forms and is recovered by filtering. The product is dried under reduced pressure to yield 157 parts of N-tert.-butylthioformamide, which melts at 124°–125° C.

Example 7

A portion of 130 parts of tert.-octylamine, freshly redistilled at 138°–143° C., is dissolved in 80 parts of methanol. This solution is treated with 39 parts of hydrogen sulfide with the temperature held at 10° C. and then with 27 parts of hydrogen cyanide. The reaction mixture is allowed to warm up to about 30° C. and left standing for 16 hours. The reaction mixture is poured with stirring into 1000 parts of water containing 60 parts of concentrated hydrochloric acid. After the addition is complete, stirring is continued for an hour. The solid product which forms is filtered off and dried in vacuo to yield 63 parts of N-tert.-octylthioformamide, melting at 58°–60° C.

An insecticidal dust was prepared to contain 10% of this product. It was tested against bean beetle larvae and found to give a kill of 90%. A 5% dust gave a kill of 80%.

Example 8

A commercial amine consisting of dodecylamines and pentadecylamines is redistilled at 116°–140° C./14 mm. A portion of 101.5 parts is dissolved in 120 parts of methanol. The solution is treated with 21 parts of hydrogen sulfide and with 13.5 parts of hydrogen cyanide, while the temperature of the mixture is kept below 20° C. The mixture is left standing for 16 hours and then distilled. The fraction distilling at 145°–155° C./1 mm. consists of 58 parts of N-alkylthioformamides in which the alkyl group contains 12 to 15 carbon atoms.

This compound was tested in standard fungitoxicity tests against *Sclerotinia fructicola* and *Macrosporium sarcineforme*. At 1% and 0.1% it gave 100% inhibition of the spores of both organisms.

This compound was also examined in insecticidal compositions. A spray containing the compound at eight pounds per 100 gallons applied against bean beetle larvae gave a kill of 80%, while at four pounds per 100 gallons a kill of 70% was obtained.

Example 9

A commercial amine consisting of alkyl amines having alkyl groups of 18 to 24 carbon atoms is redistilled at 114°–124° C./1 mm. A portion of 289 parts is dissolved in 240 parts of anhydrous methanol and with the temperature of the solution kept below 15° C. there are added 39 parts of hydrogen sulfide followed by 27 parts of hydrogen cyanide. The mixture is left standing over night at room temperature and distilled. The fraction taken at 186°–189° C./2.5 mm. consists of 164 parts of N-alkylthioformamide having alkyl groups of 18 to 24 carbon atoms.

Example 10

A solution of 114 parts of allylamine is prepared in 240 parts of methanol and treated with 68 parts of hydrogen sulfide and 54 parts of hydrogen cyanide. The reaction mixture is left standing at 30°–35° C. for 16 hours and then distilled. The fraction obtained at 110°–130° C./1 mm. consists of 117 parts of N-allylthioformamide.

In the same way there may be brought together in an inert, volatile organic solvent, particularly one that is water-miscible, hydrogen sulfide, hydrogen cyanide, and any primary or secondary amine having as N-substituents aliphatic hydrocarbon groups, particularly those having N-alkyl substituents up to 24 carbon atoms.

Example 11

A solution of 85 parts of piperidine in 200 parts of isopropanol is treated with 35 parts of hydrogen sulfide and with 27 parts of hydrogen cyanide. The mixture is stirred for 16 hours and heated slowly to reflux. The reaction mixture is subjected to distillation. The fraction taken at 145°–150° C./15 mm. is piperidinothioformamide or N-thioformylpiperidine.

In the same way an equivalent amount of pyrrolidine is reacted to give pyrrolidinothioformamide, which distills at 133°–139° C./10 mm.

Example 12

In the same way 87 parts of morpholine, 35 parts of hydrogen sulfide, and 27 parts of hydrogen cyanide are reacted in methanol. The product is morpholinothioformamide, distilling at 160°–170° C./20–25 mm.

In the same way there may be used other heterocyclic amines which have hydrogen on the nitrogen thereof available for reaction, as in thiamorpholine, 3,5-dimethylmorpholine, alkylpiperidines, N-alkylpiperazines, particularly N-methylpiperazine, etc. Piperazine itself may likewise be used and like other diamines can be reacted in steps.

The heterocycle amines are conveniently represented by the structure

where A is a divalent chain of four to five atoms forming a heterocycle with the amine nitrogen.

Example 13

A solution of 93 parts of aniline in 200 parts of methanol is cooled to 10° C. and treated with 28 parts of ammonia. There are then added 52.5 parts of hydrogen sulfide and 27 parts of hydrogen cyanide. The mixture is stirred over night at room temperature. It is then poured into 2000 parts of water with vigorous stirring. A solid forms. It is filtered off and dried. It consists of 36 parts of N-phenylthioformamide. This product melts at 137°–139° C.

The preparation is repeated with omission of ammonia. The product which is obtained melts at 139°–141° C.

Example 14

A solution of 297 parts of cyclohexylamine in 240 parts of anhydrous methanol is treated with 112 parts of hydrogen sulfide and then with 81 parts of hydrogen cyanide, while the temperature is held below 10° C. A slow exothermic reaction soon begins and carries the temperature of the reaction mixture to 43° C. The mixture is left standing over night and distilled. The fraction taken at 124°–126° C./8 mm. consists of 310 parts of N-cyclohexylthioformamide.

This product was tested by the standard fungitoxicity test against *Macrosporium sarcineforme* and *Sclerotinia fructicola*. At 0.1% it gave 100% inhibition against germination of spores of both organisms.

A 5% dust of the above product was tested against bean beetle larvae to give a 93% kill. Against milk weed bug it gave a kill of 87% when applied in a spray at a dilution of 1 to 400.

The preceding examples are pertinent to the reaction where the N-substituents are cyclic in character. The process of this invention is operative with any cyclic amine having only N-hydrogen available for reaction with hydrogen sulfide and hydrogen cyanide. There may thus be prepared N-butylphenylthioformamide, N-octylphenylthioformamide, N - methylcyclohexylthioformamide, N-trimethylcyclohexylethioformamide, etc. The cycle need not be directly attached to nitrogen, as in N-benzylthioformamide or tetrahydro- or hexahydrobenzylthioformamide.

Example 15

A solution of 133 parts of 90% ethylenediamine in 240 parts of methanol is heated with 41 parts of hydrogen sulfide with the solution kept below 10° C. Hydrogen cyanide is then added in an amount of 29 parts. The mixture is left standing for 120 hours. The methanol is stripped off to leave 119 parts of crude product. This is subjected to distillation. At 80°–165° C. liquid is taken off to leave a residue, which, by analysis is a monoamide. The residue is taken up in ethanol, treated with charcoal, and stripped to yield 40 parts of a yellow solid having the formula $NH_2CH_2CH_2NHC(S)H$.

Example 16

A solution of 58 parts of hexamethylenediamine in 100 parts of methanol is treated with hydrogen sulfide until the solution is saturated therewith at 5° C. Hydrogen cyanide (27 parts) is added. An exothermic reaction takes place, after which the mixture is left standing for two days. The solution is diluted with water to give a solid, which on recrystallization from aqueous methanol melts at 118°–120° C. It is N,N'-hexamethylene-bisthioformamide.

In place of the above diamines there may be used other alkylenediamines with branched or straight chain hydrocarbon groups. As shown above the nitrogens may be bonded by two alkylene chains. Again, the group between nitrogens may be phenylene or cyclohexylene.

The thioformamides prepared from primary or secondary amines, hydrogen sulfide, and hydrogen cyanide are useful in the fields of pesticides, rubber, lubricating oils, antioxidants, and the like.

I claim:

1. A process for preparing N-substituted thioformamides which comprises reacting together at reacting temperatures between minus 15° and 125° C. in a volatile, inert organic solvent hydrogen sulfide, hydrogen cyanide, and an amine of the formula $$R^2NH_2$$

wherein $R^2$ is a hydrocarbon group of not over 24 carbon atoms.

2. The process of claim 1 wherein $R^2$ is an alkyl group of not over 24 carbon atoms.

3. A process for preparing N-substituted thioformamides which comprises reacting together at reacting temperatures between $-15°$ and $125°$ C. in a volatile, inert organic solvent hydrogen sulfide, hydrogen cyanide, and an amine of the formula

wherein $R^1$ and $R^2$ are hydrocarbon groups of not over 24 carbon atoms.

4. The process of claim 3 wherein $R^1$ and $R^2$ are alkyl groups having not over 24 carbon atoms.

5. A process for preparing N-substituted thioformamides which comprises reacting together at reacting temperatures between $-15°$ and $125°$ C. in a volatile, inert organic solvent hydrogen sulfide, hydrogen cyanide, and an alkylenediamine of 2 to 14 carbon atoms.

6. A process of preparing N-substituted thioformamides which comprises bringing together at reacting temperatures between $-15°$ and $125°$ C. in an inert, volatile organic solvent and there reacting together hydrogen sulfide, hydrogen cyanide, and a secondary heterocyclicmonoamine.

7. The process of claim 6 wherein the heterocyclic amine is piperidine.

References Cited in the file of this patent

UNITED STATES PATENTS

| | | |
|---|---|---|
| 2,166,120 | Bousquet | July 18, 1939 |
| 2,168,847 | Ralston | Aug. 8, 1939 |
| 2,201,170 | Hanford | May 21, 1940 |
| 2,201,171 | Hanford | May 21, 1940 |
| 2,220,243 | Hoffer | Nov. 5, 1940 |
| 2,265,212 | Westphal et al. | Dec. 9, 1941 |
| 2,280,578 | Hanford et al. | Apr. 21, 1942 |

OTHER REFERENCES

Fieser et al.: Org. Chem., page 32 (1944).